United States Patent [19]
Frew et al.

[11] 3,933,263
[45] Jan. 20, 1976

[54] EASILY CLEANSABLE CONTAINER

[76] Inventors: Florence Frew, 13 Thoreau Drive, Englishtown, N.J. 07726; Janet Indiveri, 15 Paper Mill Road, Cherry Hill, N.J. 08003

[22] Filed: Mar. 25, 1974

[21] Appl. No.: 454,151

[52] U.S. Cl................ 215/13 A; 215/12 A; 220/63
[51] Int. Cl.².......................................... A47J 41/00
[58] Field of Search.......... 222/131; 215/12, 13, 11; 220/63, 15

[56] References Cited
UNITED STATES PATENTS

| | | | |
|---|---|---|---|
| 985,328 | 2/1911 | Decker | 215/11 E |
| 1,448,996 | 3/1923 | Donath | 215/12 A |
| 3,016,159 | 1/1962 | Bramming | 215/13 A |
| 3,161,311 | 12/1964 | Boston | 215/11 E |
| 3,193,126 | 7/1965 | Bramming | 215/13 A |
| 3,258,147 | 6/1966 | Rownd | 215/13 |
| 3,762,542 | 10/1973 | Grimes | 215/11 E |
| 3,790,017 | 2/1974 | Fitzpatrick | 215/11 E |

*Primary Examiner*—William Price
*Assistant Examiner*—Ro E. Hart
*Attorney, Agent, or Firm*—Charles I. Brodsky

[57] ABSTRACT

This invention describes an easily cleansable container having a disposable liner of flexible, plastic composition. The liner may incorporate an elasticized overlap to cooperate with one or more ridges on the container in holding it in place, while in use.

6 Claims, 3 Drawing Figures

EASILY CLEANSABLE CONTAINER

FIELD OF THE INVENTION

This invention relates to containers with disposable liners, in general, and to such a container of the type having a flexible plastic composition capable of withstanding a wide range of temperatures without leakage, in particular.

SUMMARY OF THE INVENTION

As will become clear hereinafter, the easily cleansable container of the invention may include a vacuum bottle, inside of which is placed a soft, poly flexible, stretchable plastic liner capable of withstanding temperatures ranging from that of ice to that of boiling water. In use, the liner is selected of a strength and composition which will hold both liquids and/or solids, and in a manner to keep the inside of the vacuum bottle free from residue when the liner is disposed of. Not only would such use of a disposable liner reduce the necessity of scrubbing the residue from the insides of the bottle, but use of such a liner would extend the life of the container in those instances where the vacuum bottle develops such cracks as would tend to leak, into the crevices between the container and its inner bottle, the liquid or solid held. In embodying the invention, an elasticized overlap could be incorporated within the stretchable liner to supplement its snug fit against the container, thereby holding the liner further in place and lessening any tendency for it to slip into the vacuum bottle when being filled or when the bottle is corked. Additionally, the neck area of the container could be provided with one or more ridge or lip portions to catch and hold the elasticized overlap should the weight of the liquid or solid be such as to tend to pull the liner through the neck and into the vacuum bottle.

As will be readily apparent, use of such disposable liners can greatly simplify the task of cleansing the vacuum bottle after use. Such use also permits the bottle to be used with increasing numbers of liquids and solids, as the increasing difficulties previously encountered in cleansing the bottle of certain liquids or solids become obviated when all that is necessary is to dispose of the liner. This will be all the more apparent upon recognition of the fact that the difficulty is thoroughly cleansing the vacuum bottle increases as the dimensions of the neck opening decrease. That is, whereas some types of residue may be easily cleansed from wide-mouthed bottles, such residue becomes more difficult to remove where the bottle is of narrow-mouthed construction. While the present invention will be described in an environment of use in keeping foods or liquids at a temperature generally unaffected by ambient temperature, the teachings herein will be equally applicable to industrial uses where thermal isolation may be a factor in material transportation and storage.

BRIEF DESCRIPTION OF THE DRAWING

These and other features of the present invention will be more clearly understood from a consideration of the following description taken in connection with the accompanying drawing in which.

DETAILED DESCRIPTION OF THE DRAWING

Figure 1:
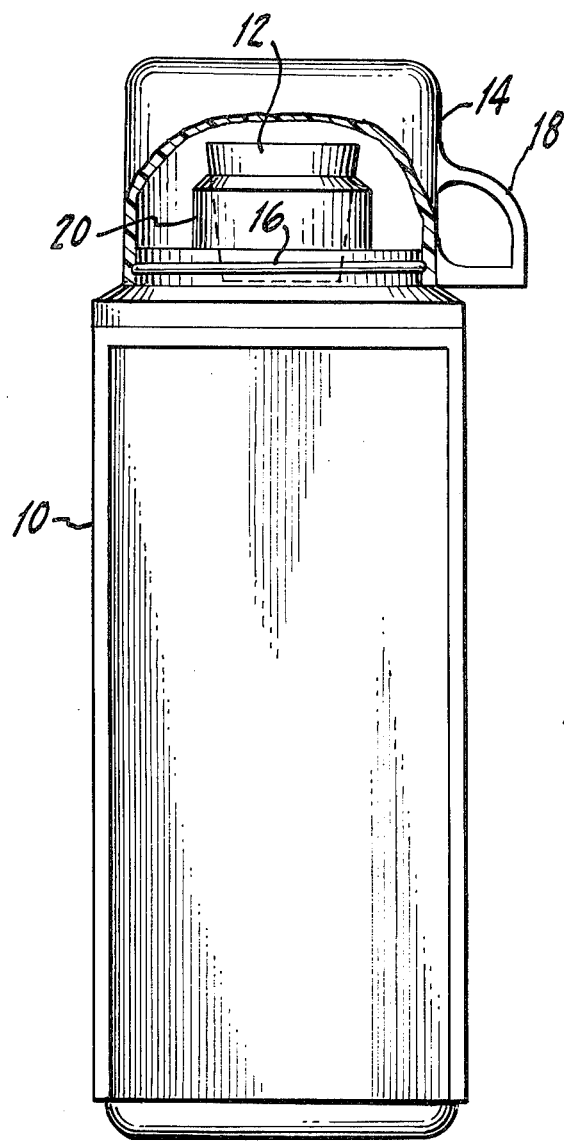
FIG. 1 is a pictorial representation of a vacuum container in which a disposable liner is placed, in accordance with the invention.

Referring now to FIG. 1, the container there shown may include an outer body or canister 10, of metal or plastic fabrication for example, to protect the vacuum bottle within, usually a glass vessel with double side walls or of plastic construction. A container closure or stopper 12, such as a cork or twist on stopper cap, closes the opening in the container through which liquids or solids pass when the vacuum bottle is being filled and when the bottle is being emptied. A drinking cup 14 screws onto the container by means of a thread 16, to complete the package when closed and for drinking the liquid or eating the solid in the bottle when emptied. A handle for the drinking cup is shown at 18, with the cork 12 passing through a riser portion 20 to seal the neck of the vacuum bottle.

Figure 2:
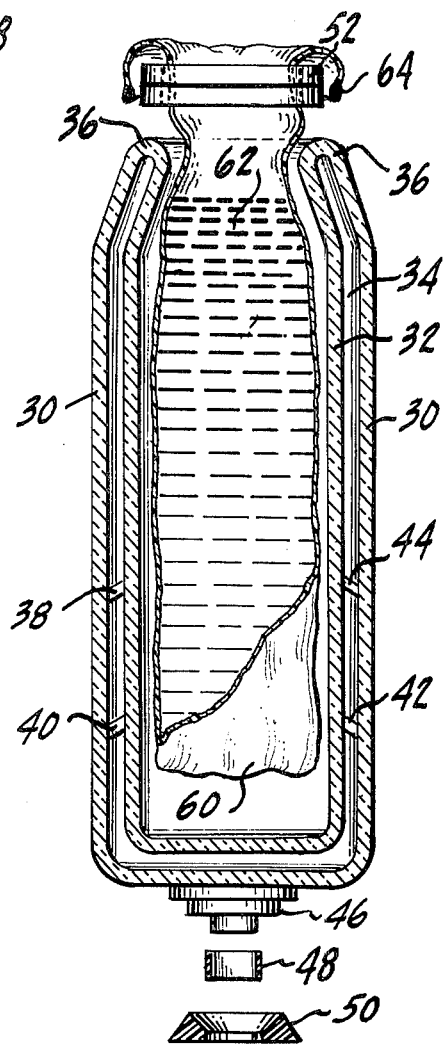
FIG. 2 shows the vacuum bottle of the container of FIG. 1, and illustrates how the liner fits within the bottle in holding food or drinks to be consumed.

Such a glass vacuum bottle is more particularly shown in FIG. 2 as including a pair of glass walls 30, 32, the space between which 34 is evacuated. The only junction of the walls 30, 32 is at the neck 36 of the vessel, with the approximate vacuum existent between the walls serving essentially as a nonconductor of heat. In order to maintain the thermal isolation within the vessel and to reduce the radiation through the walls 30, 32 to a minimum, a silver coating is placed on the inside of the outer wall 30 and on the outside of the inner wall 32. Four support pads 38, 40, 42, and 44 position the walls 30, 32 with respect to one another and, also, relieve any strain at the neck and prevent vibrations. The tip of the vacuum bottle (not shown) through which the air is exhausted in manufacture, is protected against breakage, as at 46, passing through a rubber bushing 48 to a disc-shape pad 50 to support the vacuum bottle and further absorb shock. A rubber gasket, or washer 52, completes the construction of the vacuum bottle, its inclusion being to prevent any liquids or solids from seeping into the crevice between the outer glass wall 30 and the inner walls of the metal or plastic canister of FIG. 1.

Because the chief path by which heat can be communicated to the interior of the vacuum bottle is at the junction of the walls at the vessel's neck 36, that portion is made as small as possible. Reducing its size, however, makes cleansing of the bottle particularly difficult for many types of liquids or solids. To be more specific, the usual method of cleansing, namely, flushing the glass bottle with a solution of warm water and baking soda—then rinsing the bottle with clear hot water—is not generally adequate for many soups, precooked luncheon foods, etc., where scrubbing of the bottle is needed in order to adequately remove the left-over particles.

In accordance with the invention—the purpose of which is to keep the insides of the vacuum bottle free from residue—, there is provided, as shown in FIG. 2, a disposable liner 60, which will hold the liquids and/or solids, inside of the vacuum bottle. Such disposable liner could be made of soft, poly flexible, stretchable plastic in the various shapes and sizes of the bottle—for example, being constructed similarly to a flat bag with, or without accordion type pleated sides. In use, the liner 60 is inserted through the neck portion into the bottle recess, while allowing a portion of the liner to stretch over the rim of the vacuum bottle as shown. Because of the flexibility of the plastic liner, that portion which overlaps the rim will not generally interfere with the stopper or cork used to close the bottle and, when filled with liquids and/or solids, as at 62, will generally conform towards the configuration of the vacuum bottle itself. Although a wide variety of liner sizes could be used for any given vacuum bottle size, it is preferable to use a liner whose volume is fairly close to the volume of the container so as to assure better fit and configuration to the bottle and so that the liner will not fall into the bottle due to the weight of the liquid or solid added. The stretchable liner 60 could incorporate an elasticized overlap 64 to grasp the bottle rim, to not only add to the snug fit provided by the liner as would reduce the chance of its slipping into the bottle when being filled, but to also furnish a means by which the liner could be easily grasped for removal. Once the liner is positioned within the bottle, as in FIG. 2, the food or liquid is poured in, after it is poured out; the liner can be easily removed and disposed of. An efficient and sanitary method of removing the residue from inside the vacuum bottle is thus afforded.

Figure 3:
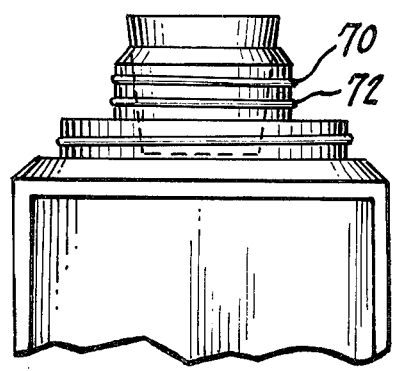
FIG. 3 shows a possible modification of a portion of the container of FIG. 1 for supplying added holding force to keep one form of liner in place.

The possible modification of FIG. 3 shows the riser 20 of the vacuum container as being provided with a pair of ridge portions 70, 72. These portions could be used where the disposable liner has an elasticized overlap, in providing a means by which the liner could further be held snugly. In particular, these ridges could act as a lip to hold the overlap in place, and could be accomplished by making the space between the ridges 70, 72 slightly greater than its thickness. At the same time, these ridge portions 70, 72 could serve as additional threads by means of which a cap having a stopper protrusion could be screwed onto the riser 20 as a replacement for the cork 12 of FIG. 1. Such arrangement will be seen to facilitate the manner by which the neck opening could be opened or closed. Because the disposable liner is selected of a flexible plastic construction, that portion which overlaps the rim of the bottle would not generally interfere with the lid thus employed to close the bottle construction.

While there have been described what are considered to be preferred embodiments of the present invention, it will be readily apparent that modifications may be made by those skilled in the art without departing from the scope of the teachings herein. Such teachings will be more clearly appreciated from a reading of the appended claims. It will be readily seen however, that, with or without elasticized overlaps, this described use of a flexible, stretchable plastic liner to hold against the container while retaining liquids, solids and the like can well serve to eliminate the necessity of scrubbing residue from the inner walls of vacuum bottles after use.

We claim:

1. An easily cleansable container comprising:

an outer housing;

an inner vacuum bottle providing a substantially thermally isolated environment;

a disposable liner situated within said vacuum bottle and adapted to receive liquids, solids or the like for retention in said environment, said liner being arranged to fold around at least a portion of said housing; and a stopper positioned to jointly close said inner bottle and said disposable liner to hold said liquids, solids or the like in place when it is desired to keep them at their initial temperatures, and positioned to jointly open said inner bottle and dispoable liner when removed to provide access to the liquids, solids or the like held within wherein said disposable liner is of a flexible, stretchable plastic composition to hold against said portion of the outer housing;

wherein said disposable liner incorporates an elasticized material band around an outer edge thereof, positioned to further hold the liner against said portion of the outer housing and to present an easy manner of grasping the liner for removal when it is desired to be discarded; and wherein the portion of the outer housing around which said disposable liner is folded includes a lip portion arranged to cooperate with said elasticized band to hold it in place and the liner further against said housing in preventing total insertion of said liner in said vacuum bottle.

2. The container of claim 1 wherein said disposable liner is selected to receive liquids, solids or the like in volume proportionate to the volume of said container to reduce tendencies of the weight of liquid or solid added to draw said liner into said inner bottle.

3. The container of claim 1 wherein said disposable liner is of a flexible, stretchable plastic composition capable of withstanding temperatures from that of ice to that of boiling water.

4. The container of claim 1 wherein said lip portion comprises one or more ridges circumventing said housing and wherein said stopper is screwed onto said outer housing and into said inner vacuum bottle along said circumventing ridges.

5. The container of claim 1 wherein said vacuum bottle is of double wall, glass construction, the space between which is evacuated.

6. The container of claim 1 wherein said stopper comprises a cork.

* * * * *